United States Patent [19]
Umeda

[11] Patent Number: 5,470,494
[45] Date of Patent: Nov. 28, 1995

[54] OXIDE TYPE SOLID LUBRICANT

[75] Inventor: Kazunori Umeda, Tsukuba, Japan

[73] Assignees: Agency of Industrial Science & Technology; Ministry of International Trade & Industry, both of Tokyo, Japan

[21] Appl. No.: 301,564

[22] Filed: Sep. 7, 1994

[51] Int. Cl.[6] ............................................. C10M 103/06
[52] U.S. Cl. .......................... 252/12; 252/25; 423/593; 423/596; 501/102; 501/132
[58] Field of Search ............................ 252/25, 18, 12; 423/593, 596; 501/132, 102

[56] References Cited

U.S. PATENT DOCUMENTS

| | | | |
|---|---|---|---|
| 2,231,945 | 2/1941 | Pole | 423/593 |
| 3,403,970 | 10/1968 | Culbertson | 423/596 |
| 3,816,309 | 6/1974 | Coucier et al. | 252/12 |
| 3,832,441 | 8/1974 | Schoenlaub | 423/593 |
| 3,870,787 | 3/1975 | Blumenthal | 423/593 |
| 4,005,184 | 1/1977 | Bamberger et al. | 423/596 |
| 4,293,534 | 10/1981 | Arendt | 423/593 |
| 4,293,535 | 10/1981 | Arendt | 423/593 |
| 4,595,580 | 6/1986 | Uedaira et al. | 423/593 |
| 5,100,848 | 3/1992 | Enomoto et al. | 252/12 |

*Primary Examiner*—Margaret Medley
*Attorney, Agent, or Firm*—Oblon, Spivak, McClelland, Maier & Neustadt

[57] ABSTRACT

An oxide type solid lubricant is formed of a powder of a fired composite ceramic material resulting from heating a mixture of $BaZrO_3$ and $Cr_2O_3$ powders in which the $Cr_2O_3$ content is up to 80% by weight.

4 Claims, 4 Drawing Sheets

OXIDE TYPE SOLID LUBRICANT

BACKGROUND OF THE INVENTION

1. Field of the Invention

This invention relates to an oxide type solid lubricant which maintains outstanding lubricity in the open air or in an oxidizing atmosphere over a wide temperature range of from room temperature to about 1,000° C.

2. Description of the Prior Art

The mechanical elements of various high temperature devices such as, for example, the flow path control devices in supersonic jet engine combustion chambers, the mechanical seals in the combustion chambers of ceramic gas turbines, and the drive components in MOCVD devices are frequently exposed to changes in temperature within the range of from room temperature to elevated temperatures. However, oil lubrication cannot be used at elevated temperatures and it is difficult to obtain solid lubricants that are able to maintain their lubricity up to a temperature of around 1,000° C. The mechanical elements must therefore be cooled by a suitable means or be isolated from regions heated to elevated temperatures, which entail complication of design. If a lubricant can be developed that functions stably within such wide temperature range, the devices could be simplified without a need to resort to a complex or unreasonable design, since materials that are resistant to high temperatures have been developed for use in the construction of such devices.

Solid lubricants in common use include non-oxide type solid lubricants such as graphite and $MoS_2$, which under atmospheric conditions can be utilized in temperature ranges having an upper limit of about 500° C. In contrast, oxide type solid lubricants are stable and can resist oxidation at elevated temperatures, and either exhibit high coefficients of friction at room temperature and an upper working temperature limit of around 600° C. to 800° C., or melt and exhibit lubricity only at elevated temperatures. Thus, there is as yet no solid lubricant that is stable and exhibits lubricity over a wide temperature range of from room temperature to about 1,000° C. while also satisfying the various other requirements.

In response, U.S. Pat. No. 5,100,848 proposed a solid lubricant formed of a sintered composite ceramic material resulting from mixing and sintering powders of $Na_2ZrO_3$ and $Cr_2O_3$. In this process part of the chromium is replaced by zirconium to form a solid lubricant having good cleavability, and it is effective in that the solid lubricant exhibits outstanding lubricity at temperatures ranging from room temperature to about 1,000° C.. However, it was found that this solid lubricant has various problems, such as that when left in the open air it absorbs moisture and exhibits deliquescence, it starts to melt at 730° C., and its lubricating properties are affected by slight differences in forming conditions.

An object of this invention is to provide an oxide type solid lubricant which does not exhibit deliquescence when left in the open air or changes in lubricating properties caused by slight variations in forming conditions, and stably exhibits outstanding lubricity in the open air or in an oxidizing atmosphere over a wide temperature range of from room temperature to about 1,000° C..

SUMMARY OF THE INVENTION

To attain the above object, this invention provides an oxide type solid lubricant formed of a powder of a heated composite ceramic material resulting from heating a mixture of $BaZrO_3$ and $Cr_2O_3$ powders having a $Cr_2O_3$ content in the range of about 10% to about 50% by weight.

The object is also attained by an oxide type solid lubricant formed of a heated composite ceramic material resulting from heating a mixture of $CaZrO_3$ and $Cr_2O_3$ powders having a $Cr_2O_3$ content in the range of 10 to 50% by weight.

An oxide type solid lubricant formed of a mass of either one of the two composite ceramic materials mentioned above also attains the object of this invention.

The solid lubricant thus constituted exhibits outstanding lubricity over a wide temperature range of from room temperature to about 1,000° C. in the open air or in an oxidizing atmosphere, and since it does not contain Na it does not exhibit deliquescence even when left in the open air.

Other objects and features of the invention will become apparent from the accompanying drawings and following detailed description of the invention.

DESCRIPTION OF THE PREFERRED EMBODIMENT

Figure 1:
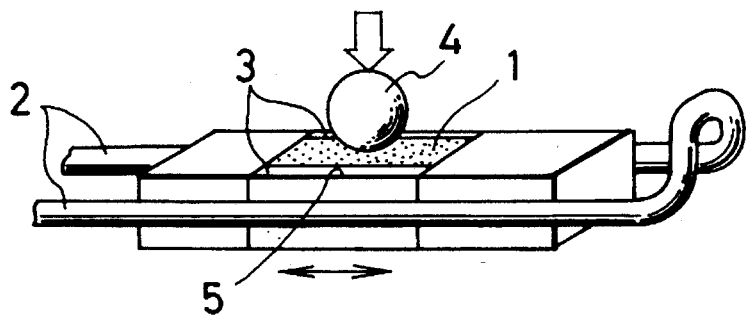
FIG. 1 is a perspective view showing the principal parts of a reciprocating friction tester used to measure the coefficient of friction of the material of the invention.

As a solid lubricant that can be stably used in the open air or in an oxidizing atmosphere over a wide range of temperatures extending from room temperature up to about 1,000° C., conventionally an oxide type solid lubricant has been considered preferable. However, it is difficult to obtain a lubricant from a simple metal oxide that satisfies such requirements.

As the same type of composite oxide material as the previously-proposed $Na_2ZrO_3$-$Cr_2O_3$ mentioned above, the present inventor mixed $Cr_2O_3$ powder with $BaZrO_3$ powder and with $CaZrO_3$ powder, heated the mixtures and pulverized the resulting material to obtain a composite oxide powder. This powder was then applied to an alumina surface and the frictional properties of each of the resulting coating layers were measured at temperatures ranging from room temperature up to 1,000° C., providing the good results described below. This invention is based on these findings.

Powder of the heated composite ceramic of this invention formed by heating a mixture of powders of $BaZrO_3$ and $Cr_2O_3$ at around 1,100° C. exhibited outstanding lubricity even when the powder did not include $Cr_2O_3$, could be effectively used with a $Cr_2O_3$ content prior to heating that was in the range of from zero to 80% by weight, and exhibited relatively preferable lubricity with a $Cr_2O_3$ content of around 10 to 50% by weight, providing a stably low coefficient of friction which, within the range of temperatures of from room temperature up to 1,000° C., was lowest with a $Cr_2O_3$ content of around 20 to 30% by weight.

Powder of the heated composite ceramic material formed by mixing and heating powders of $CaZrO_3$ and $Cr_2O_3$ could be effectively used when the $Cr_2O_3$ content prior to heating was from 10 to 50% by weight and exhibited relatively preferable lubricity with a $Cr_2O_3$ content of around 15 to 40% by weight, providing a stably low coefficient of friction which, within the range of temperatures of from room temperature up to 1,000° C., was lowest with a $Cr_2O_3$ content of around 20 to 30% by weight.

Moreover, powders of the above heated ceramic can be formed into a mass that can be used as a solid lubricant which exhibits the same required lubricity as the powder at temperatures ranging from room temperature up to 1,000° C..

X-ray diffraction analysis of the above heated powder of $BaZrO_3$-$Cr_2O_3$ revealed that it had undergone a change to $BaCrO_4$-$BaCr_2O_3$-$ZrO_2$, of which friction tests showed $BaCrO_4$ to be the component contributing to lubrication.

The inventor also heated a mixture of powders of BaO and $Cr_2O_3$ at around 1,100° C. and measured the lubricating properties of the heated material thus formed (e.g. $BaCrO_4$-$BaCr_2O_3$-$BaCrO_3$), which showed that outstanding lubricity was obtained when the powder mixture prior to heating contained 15 to 70% by weight of $Cr_2O_3$. Since neither of the powdered heated materials contained Na, they did not exhibit deliquescence even after being left for around one month in the open air at a relative humidity in the approximate range of from 60 to 90%.

As shown in the following examples, the oxide type solid lubricant of this invention can stably maintain a relatively low coefficient of friction in the open air or in an oxidizing atmosphere over a wide temperature range of from room temperature to an elevated temperature of around 1,000° C., and can be utilized as a solid lubricant that has stable lubricating properties and which, unlike the $Na_2ZrO_3$-$Cr_2O_3$ oxide type solid lubricant of the prior art, does not exhibit deliquescence in the open air, melt at temperatures below 1,100° C. or have lubricating properties affected by differences in forming conditions.

Embodiments of the present invention will now be described with specific reference to working examples.

The following Table 1 shows the $Cr_2O_3$ mixture ratio in each of the composite oxide solid lubricants of the invention.

TABLE 1

| Solid lubricant | $Cr_2O_3$ ratio (%) |
| --- | --- |
| $BaZrO_3$ + $Cr_2O_3$ | 0, 15, 21.6, 22.5, 25, 28.8, 50, 100 |
| $CaZrO_3$ + $Cr_2O_3$ | 0, 28.8, 29.8, 50, 100 |
| BaO + $Cr_2O_3$ | 0, 15, 33.1, 40, 70, 100 |
| $BaCrO_4$ | 0 |

Powders of $BaZrO_3$ and $Cr_2O_3$, and of $CaZrO_3$ and $Cr_2O_3$, were measured to form mixture weight ratios calculated to produce mole ratios of 2:1, and BaO and $Cr_2O_3$ were measured to produce ratios close to the stoichiometrical ratio of $BaCrO_4$, as shown in Table 1. The powders were then thoroughly mixed in an agate mortar. The powders had a particle size distribution in the range of from 0.1µm to several µm.

Each of the powdered mixtures was placed in a ceramic crucible, heated for one hour at 1,100° C. in an electric oven and gradually cooled over a period of five hours, and the resulting heated large size powder was then pulverized into a fine powder in the agate mortar. Each of the powders thus obtained was mixed with ethyl alcohol, evenly applied to the surface of an alumina test piece and heated for one hour at 1,100° C. in the electric oven to form the applied powder into a coating layer.

The coated test pieces were each subjected to high-frequency induction heating using an apparatus, such as the one shown in FIG. 1, that enabled the temperature to be controlled with the range of from room temperature up to 1,000° C.. With reference to FIG. 1, reference numeral 1 denotes a test piece, 2 a high-frequency induction coil for heating the test piece 1, 3 a holder of SUS 310S stainless steel which holds the test piece 1 and slides horizontally as indicated by the double-headed arrow, 4 an alumina ball with a diameter of 10 mm used as a counter frictional element, and 5 a thermocouple.

The coating layers were tested for frictional properties. For this, the coefficient of friction of each coating layer was measured by pressing the alumina ball 4 against the coating layer under a load of 9.8N while the coated test piece was reciprocated at 0.12 m/min as the temperature was changed from room temperature to an elevated temperature of 950° C. to 1,000° C.. After the test, an optical microscope was used to check the samples for frictional marks left by the alumina ball.

Figure 2:
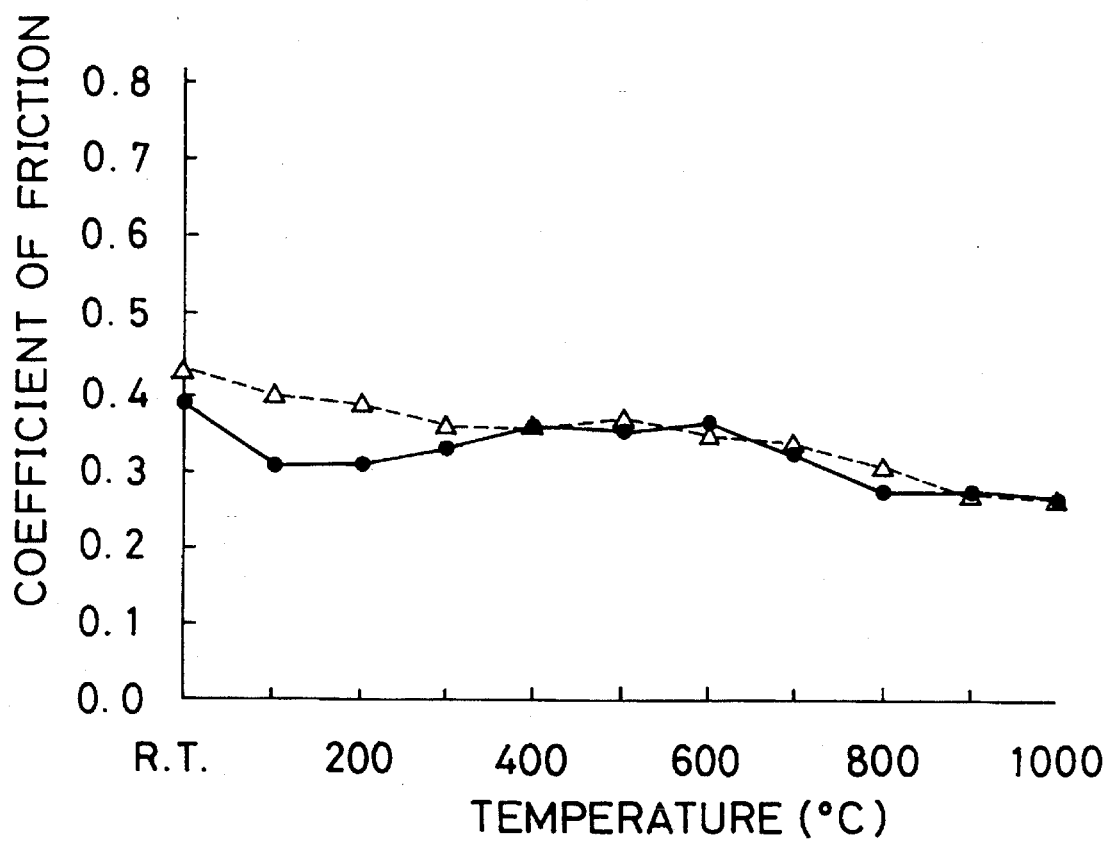
FIG. 2 is a graph showing the coefficient of friction of a coating layer of the heated material of $BaZrO_3$-$Cr_2O_3$ having a $Cr_2O_3$ content of 28.8% by weight as a function of temperature.
Figure 3:
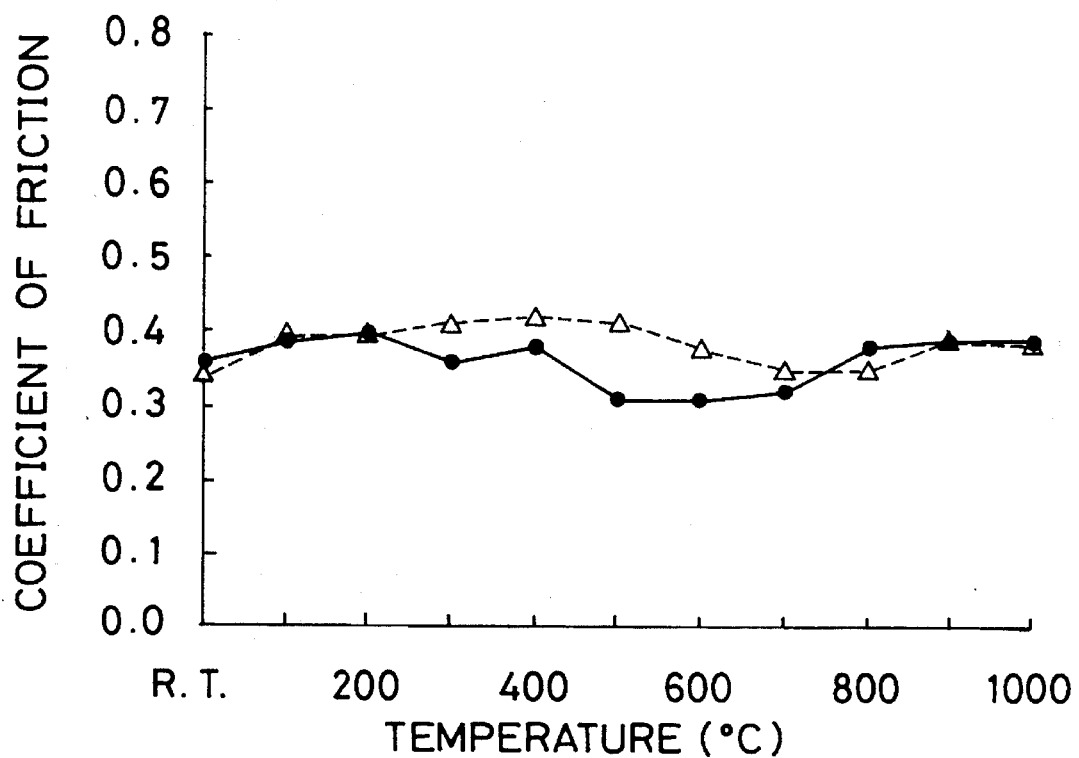
FIG. 3 is a graph showing the coefficient of friction of a coating layer of the heated material of $CaZrO_3$-$Cr_2O_3$ having a $Cr_2O_3$ content of 28.8% by weight a function of temperature.
Figure 4:
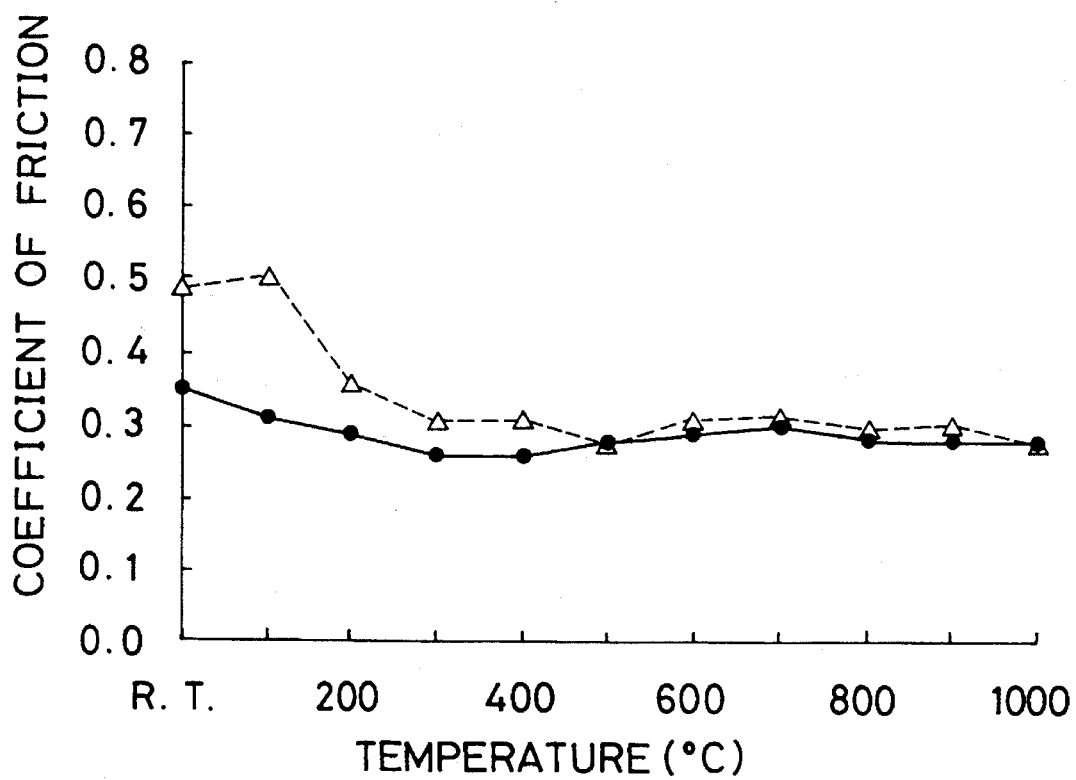
FIG. 4 is a graph showing the coefficient of friction of a coating layer of the heated material of $BaCrO_4$ as a function of temperature.
Figure 5:
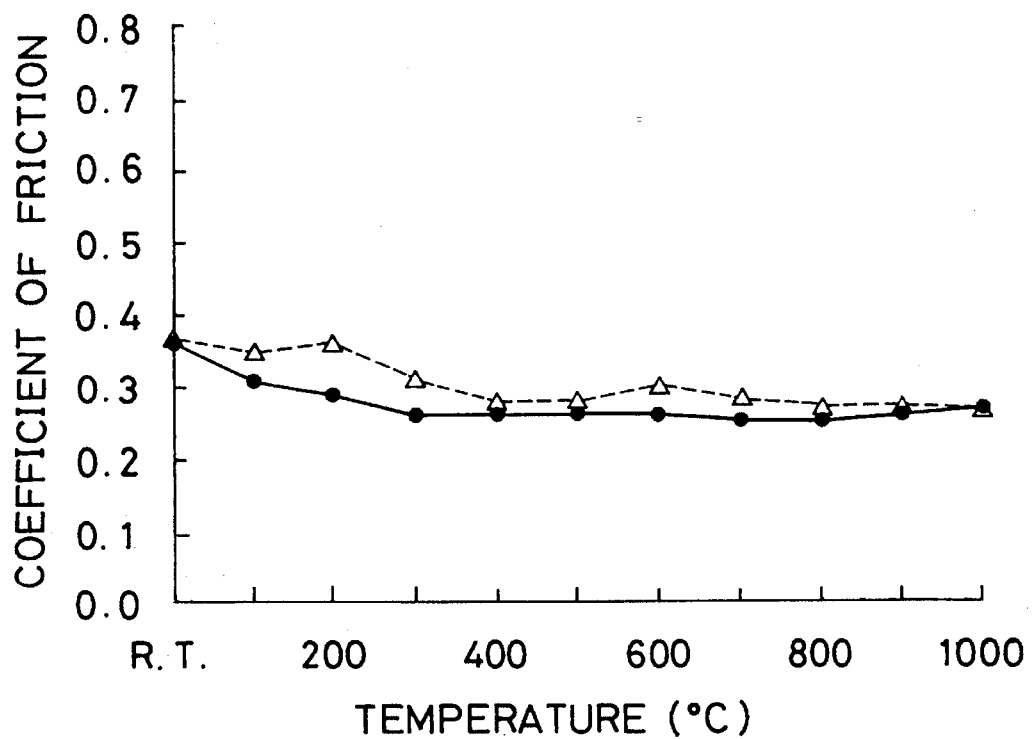
FIG. 5 is a graph showing the coefficient of friction of a coating layer of the heated material of $BaO$-$Cr_2O_3$ having a $Cr_2O_3$ content of 33% by weight as a function of temperature.

As an example of the relationships between coefficient of friction and temperature of the test piece, FIG. 2 shows the results of frictional property measurements on a coating layer of $BaZrO_3$-$Cr_2O_3$ having a $Cr_2O_3$ content of 28.8% by weight, and FIG. 3 shows the results of such measurements on a coating layer of $CaZrO_3$.$Cr_2O_3$ having a $Cr_2O_3$ content of 28.8% by weight. In FIG. 2 to FIG. 5, the friction coefficient during temperature increase was indicated by triangles while that during temperature decrease by solid circles. Over the temperature range from room temperature to a temperature of 1,000° C., the coefficient of friction in the case of $BaZrO_3$ +28.8 wt % $Cr_2O_3$ was within the range of about 0.25 to 0.35, and in the case of $CaZrO_3$+28.8 wt % $Cr_2O_3$ was within the range of about 0.3 to 0.4. FIG. 4 shows the results of measurements on a coating layer of powdered $BaCrO_4$, which is considered to be an effective solid lubricant, based on an x-ray diffraction analysis of $BaZrO_3$-$Cr_2O_3$, and FIG. 5 shows the results of measurements on a coating layer of heated BaO-$Cr_2O_3$ powder in which the $Cr_2O_3$ content is 33% by weight. Both of these showed coefficients of friction during a stable temperature reduction phase in the order of 0.25 to 0.35. Compared to the $Na_2ZrO_3$ +28.8 wt % $Cr_2O_3$ of the previous proposal, each had a coefficient of friction that was slightly higher over the whole range of temperatures, but was relatively stable and exhibited no deliquescence.

Figure 6:
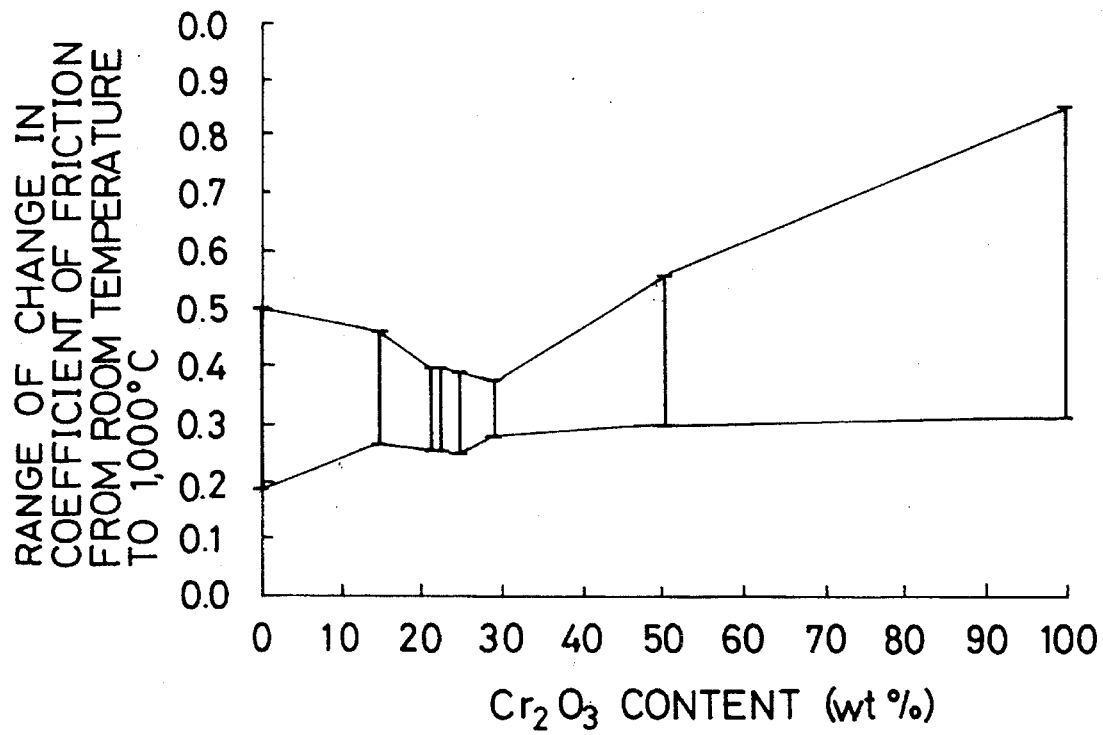
FIG. 6 is a graph showing the relationship between the $Cr_2O_3$ content of a $BaZrO_3$-$Cr_2O_3$ type composite oxide and the range of changes in the coefficient of friction at from room temperature up to 1,000° C.
Figure 7:
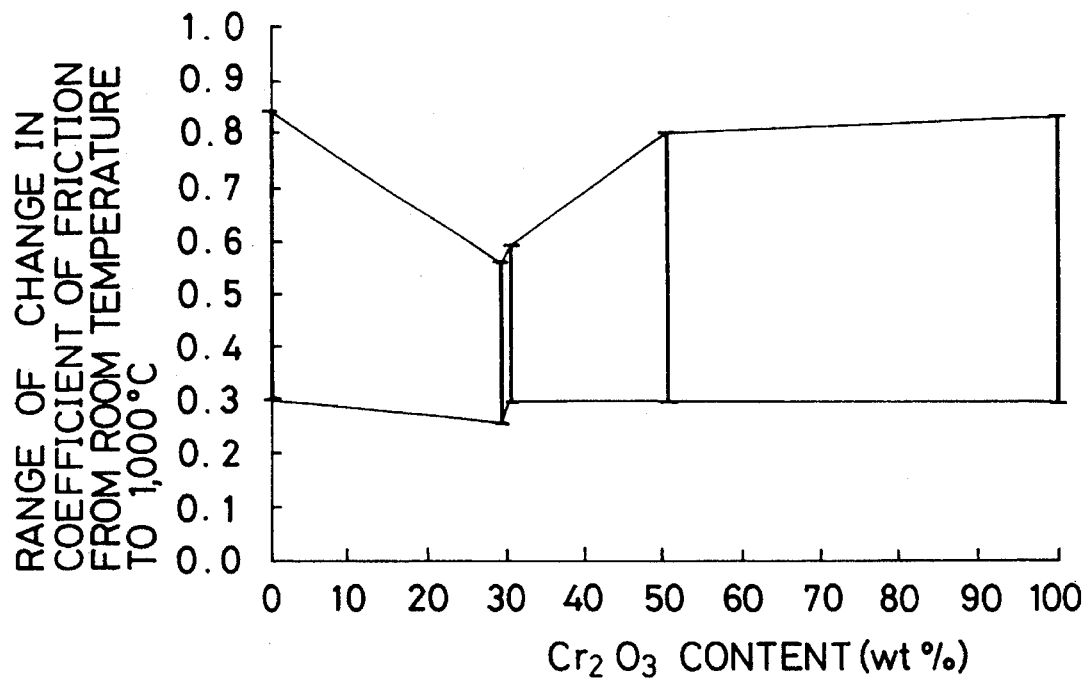
FIG. 7 is a graph showing the relationship between the $Cr_2O_3$ content of a $CaZrO_3$-$Cr_2O_3$ type composite oxide and the range of changes in the coefficient of friction at from room temperature up to 1,000° C.
Figure 8:
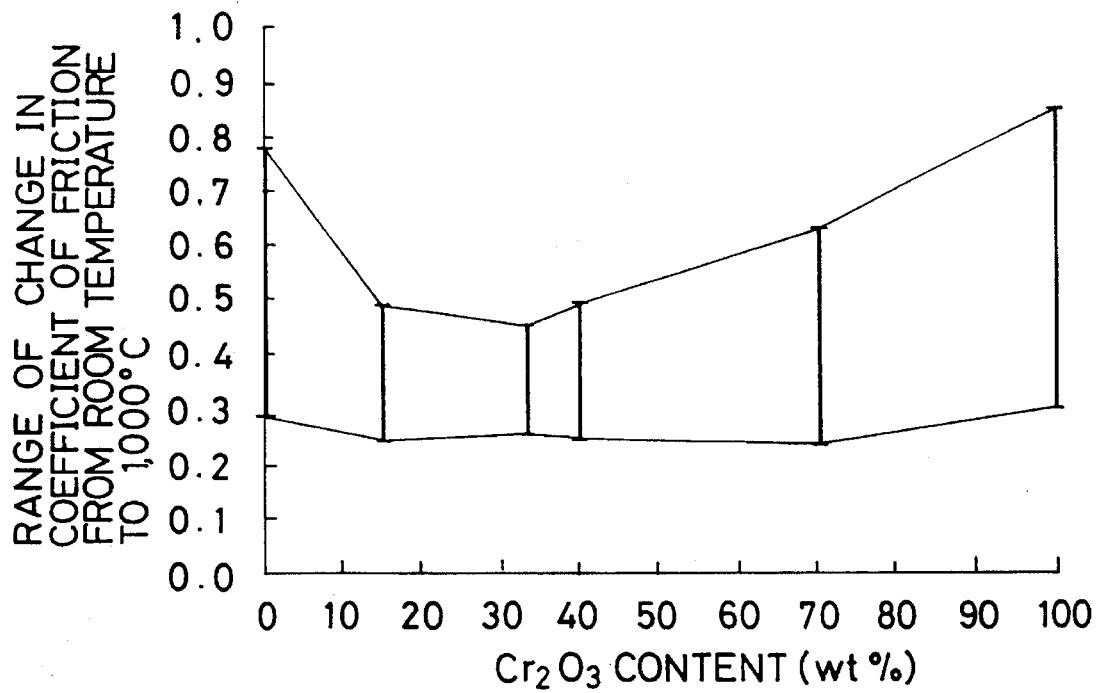
FIG. 8 is a graph showing the relationship between the $Cr_2O_3$ content of a $BaO$-$Cr_2O_3$ type composite oxide and the range of changes in the coefficient of friction at from room temperature up to 1,000° C..

FIGS. 6 to 8 show the relationship between the amount of added $Cr_2O_3$ in composite oxides and the range of changes in the coefficients of friction at from room temperature to 1,000° C.. In the graphs, the lower and upper ends of the vertical lines represent minimum and maximum coefficient of friction values, respectively, over the range of temperatures extending from room temperature to 1,000° C.. In the case of the $BaZrO_3$-$Cr_2O_3$ type composite oxide of FIG. 6, the coefficient of friction was lowest when the $Cr_2O_3$ content was 20 to 30% by weight, and lubricity was observed even with a 100% $BaZrO_3$ sample. On the other hand, in the case of the $CaZrO_3$-$Cr_2O_3$ type composite oxide of FIG. 7, at 100% $CaZrO_3$ no lubricity was observed, and the coefficient of friction value was lowest at a $Cr_2O_3$ content was around 30% by weight, about the same as in the case of $Na_2ZrO_3$-$Cr_2O_3$ and $BaZrO_3$-$Cr_2O_3$. The $BaO$-$Cr_2O_3$ type composite oxide of FIG. 8 showed a relatively good coefficient of friction at a $Cr_2O_3$ content range of about 15 to 70% by weight.

Test piece samples were also subjected to frictional testing while the temperature was raised from room temperature to 1,000° C. and lowered back to room temperature. After the test optical micrographs were taken and checked for evidence of frictional marks left by the alumina ball. No clear frictional marks were found on coatings of $BaZrO_3$-$Cr_2O_3$ or $CaZrO_3$-$Cr_2O_3$, in each of which transfers were observed that were considered to be composite oxides functioning as solid lubricants. In contrast, frictional marks around 400 µm in diameter were observed on a comparative sample of 100% $Cr_2O_3$. These findings showed that the composite oxides $BaZrO_3$-$Cr_2O_3$ and $CaZrO_3$-$Cr_2O_3$ exhibited outstanding lubricity and were also highly effective for reducing friction.

Thus, the oxide type solid lubricant of this invention provides a solid lubricant that stably exhibits outstanding lubricity in the open air or in an oxidizing atmosphere over a wide range of temperatures extending from room temperature up to around 1,000° C., and overcomes the drawbacks of the $Na_2ZrO_3$-$BaZrO_3$ type solid lubricant of the prior art.

What is claimed is:

1. A solid oxide lubricant formed of a powder of heated composite ceramic material resulting from heating a mixture of $BaZrO_3$ powder and $Cr_2O_3$ powder, with a $Cr_2O_3$ content, prior to said heating, in the range of about 10% to about 50% by weight.

2. A solid lubricant according to claim 1, wherein the powder of heated composite ceramic material is formed into a mass.

3. An oxide type solid lubricant formed of a powder of heated composite ceramic material resulting from heating a mixture of $CaZrO_3$ and $Cr_2O_3$ powders having a $Cr_2O_3$ content in the range of 10 to 50% by weight.

4. A solid lubricant according to claim 3, wherein the powder of heated composite ceramic material is formed into a mass.

* * * * *

UNITED STATES PATENT AND TRADEMARK OFFICE
CERTIFICATE OF CORRECTION

PATENT NO. : 5,470,494
DATED : November 28, 1995
INVENTOR(S) : Kazunori UMEDA et al.

It is certified that error appears in the above-indentified patent and that said Letters Patent is hereby corrected as shown below:

On the title page, Item [30], the Foreign Application Priority Data has been omitted, please insert:

--Sept. 7, 1993    [JP]    JAPAN.............5-246251--

Signed and Sealed this

Twentieth Day of February, 1996

Attest:

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,470,494
DATED : November 28, 1995
INVENTOR(S) : Kazunori UMEDA et al.

It is certified that error appears in the above-indentified patent and that said Letters Patent is hereby corrected as shown below:

On the title page, Item [73], the Assignee is written incorrectly. It should read:

--[73] Assignee: Agency of Industrial Science & Technology, Ministry of International Trade & Industry, Tokyo, Japan--

Signed and Sealed this

Twenty-eighth Day of May, 1996

Attest:

BRUCE LEHMAN

Attesting Officer    Commissioner of Patents and Trademarks